United States Patent [19]

Andrews et al.

[11] 4,394,956
[45] Jul. 26, 1983

[54] ELECTRIC STOCK PROD

[75] Inventors: James S. Andrews, Westminster; Leonard L. Hierath, Denver, both of Colo.

[73] Assignee: The Magrath Company, McCook, Nebr.

[21] Appl. No.: 62,450

[22] Filed: Jul. 30, 1979

Related U.S. Application Data

[63] Continuation of Ser. No. 754,341, Dec. 27, 1976, abandoned.

[51] Int. Cl.³ .................. B68B 11/00; F41B 15/04
[52] U.S. Cl. .................. 231/2 E; 273/84 ES; 362/202–207;197
[58] Field of Search .............. 231/2 E; 273/84; 47/1.3

[56] References Cited

U.S. PATENT DOCUMENTS

| Re. 14,088 | 3/1916 | Koretzky | 362/206 |
|---|---|---|---|
| D. 175,158 | 7/1955 | Darr | D30/32 |
| 1,210,112 | 12/1916 | Smith | 231/2 E |
| 1,321,639 | 11/1919 | Hutchings | 362/202 |
| 1,336,067 | 4/1920 | Burgess | 362/204 |
| 1,369,564 | 2/1921 | Slady | 362/204 |
| 1,590,624 | 6/1926 | Hendory et al. | 362/204 |
| 2,204,041 | 6/1940 | Jefferson | 231/2 E |
| 2,226,353 | 12/1940 | Wood | 362/204 |
| 2,341,057 | 2/1944 | Muldoon | 362/204 |
| 2,549,103 | 4/1951 | Krauss | 362/205 |
| 2,561,122 | 7/1951 | Juergens | 231/2 E |
| 2,981,465 | 4/1961 | Bartel | 231/2 E |
| 3,119,554 | 1/1964 | Fagan et al. | 231/2 E |
| 3,227,362 | 1/1966 | Laten | 231/2 E |
| 3,362,711 | 1/1968 | Larsen et al. | 231/2 E |
| 3,509,693 | 5/1970 | French | 231/2 E |
| 3,626,626 | 12/1971 | Blanc | 231/2 E |
| 3,885,733 | 5/1975 | Kiebold et al. | 231/2 E |
| 3,917,268 | 11/1975 | Tingey et al. | 231/2 E |

FOREIGN PATENT DOCUMENTS 211208 6/1966 U.S.S.R. .......................... 231/2 E

Primary Examiner—Paul J. Hirsch
Attorney, Agent, or Firm—Wm. Griffith Edwards

[57] ABSTRACT

A stock or cattle prod for applying an electric shock to stock to induce them to move when loading them for transportation or through a cattle chute or the like comprises a handle having a high voltage generator and a battery therein. A head, which is angularly rotatable relative to the handle structure, is provided, this head having electrical contact means adapted to electrically, conductively contact said handle in any selectable angular position therebetween the head being adapted to extend forward from said handle and comprising a shaft carrying the contact means and, forward from this shaft terminating in a pair of spaced conducting tips or electrodes. The handle is constructed to insulate and protect the high voltage conductors and to provide a convenient switch for energizing the tips. The handle and shaft are constructed to afford rotation of the tips to any desired angle with respect to the operator's hand, both the handle and head being provided with external electrical insulation means effective to protect the operator from the electrical shock voltage, insulation while maintaining the electrical connections to the tips. The head on which the tips are mounted is relatively flat and is adapted to be held in face engagement with an animal's body, this facilitating the effective handling of the prod during use.

23 Claims, 14 Drawing Figures

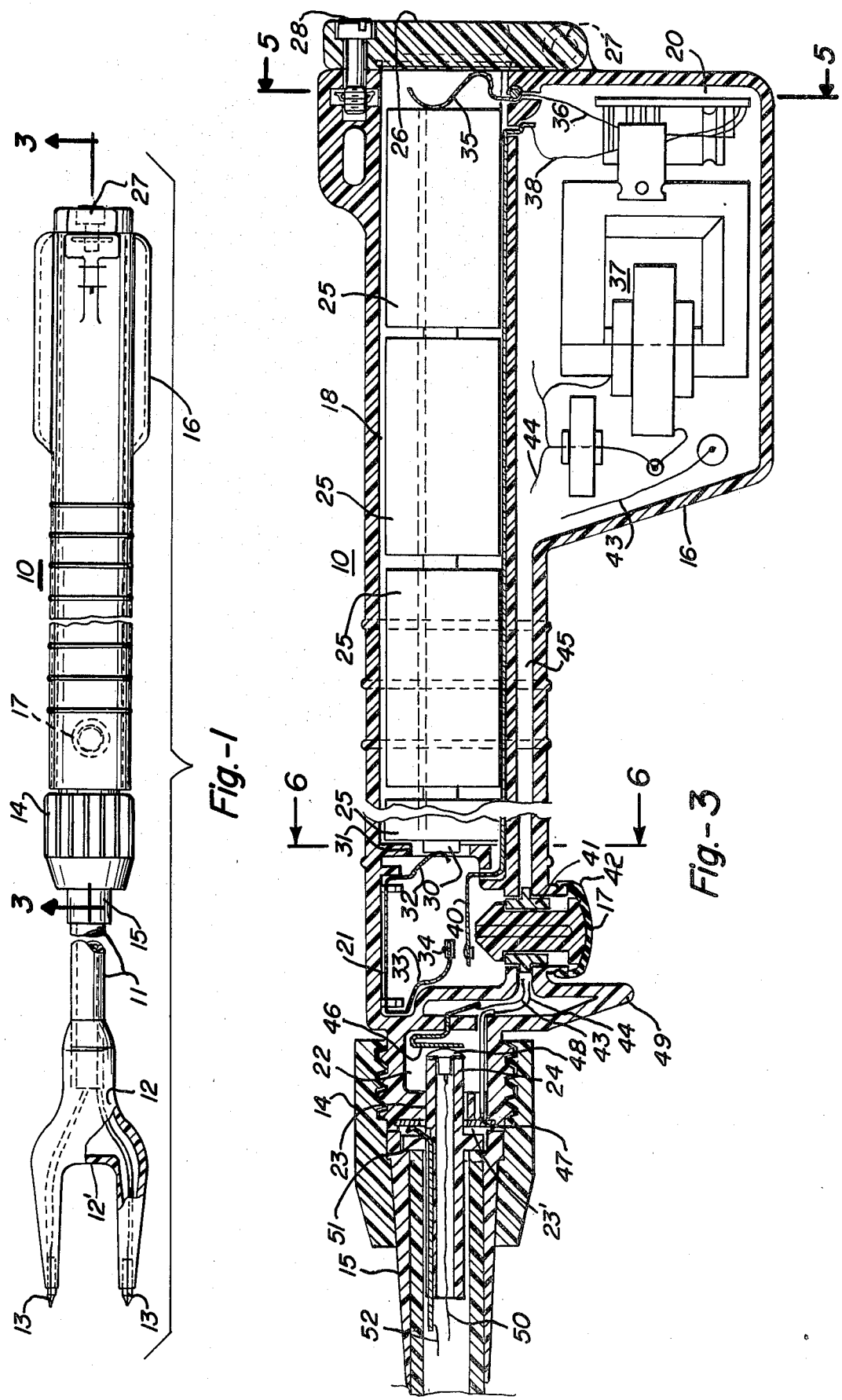

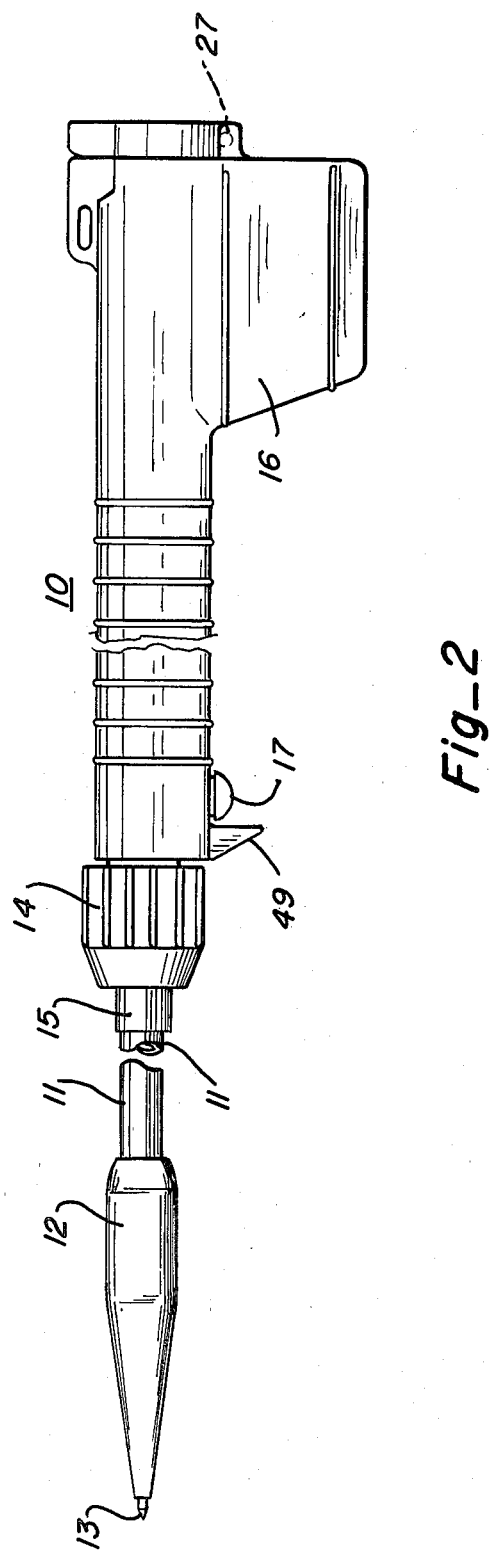
Fig_2

ELECTRIC STOCK PROD

BACKGROUND OF THE INVENTION AND PRIOR ART

The present Rule 1.60 application is a continuation of Ser. No. 754,341, filed Dec. 27, 1976 now abandoned, assigned of record to the assignee of this application.

REFERENCE TO RELATED PATENTS AND APPLICATIONS

Reference is made herewith to Design Pat. No. 244,626, having as inventor one of the inventors of this application and being assigned to the assignee hereof, said Design Patent being directed solely to two preferred ornamental designs of the external surfaces of the head structure described, illustrated and claimed herein, said Design Pat. No. 244,626 having matured from Design Application Ser. No. 692,567, filed June 3, 1976, and having issued on June 7, 1977, so that it was co-pending with the parent applications Ser. No. 727,021, filed Sept. 27, 1976 now abandoned, and Continuation-In-Part thereof Ser. No. 754,341, filed Dec. 27, 1966 now abandoned.

This invention relates to stock prods or the like for applying electric shocks to animals to induce them to move and it relates particularly to an improved self-contained electric stock prod which is safe, rugged, well balanced and easy to use.

Stock or cattle prods are employed on ranches, feed lots and the like to induce the animals to move when required and have facilitated the handling of cattle about the stock yards, dipping baths, transportation facilities and the like. The prods enable the operators to move the animals more quickly and save time and personnel in the handling of cattle, for example. Self-contained electric stock prods have been used extensively and are easily carried to remote places for herding cattle or the like; they are thus not restricted to use where electric power is available in the yards or at the loading chutes or the like. Such electric stock prods usually are provided with a pair of spaced conducting tips which apply a high voltage low energy shock to the animal. The following U.S. Letters Patent are illustrative of the prior art U.S. Pat. No. 2,561,122—Juergens
U.S. Pat. No. 2,981,465—Bartel
U.S. Pat. No. 3,119,554—Fagan et al.
U.S. Pat. No. 3,227,362—Laten
U.S. Pat. No. 3,509,693—French
U.S. Pat. No. 3,626,626—Blanc
U.S. Pat. No. 3,885,733—Klebold et al. When moving one animal after another through a chute, for example, the prod is held in one hand and applied as required for substantially the same position of the operator time after time.

SUMMARY OF THE INVENTION

The location of the shock applying tips so that they lie in a line for touching the animal at the same time is desirable for quick and effective use of the prod without having to adjust the position of the hand. Accordingly, it is an object of this invention to provide an electric stock prod of simple and rugged construction and including an improved arrangement for setting the tips for optimum positioning for each condition of use.

It is another object of this invention to provide a self-contained electric stock prod including an improved arrangement for containing and isolating the high voltage conductors.

It is another object of this invention to provide an electric stock prod including an improved tip or applicator head for facilitating the safe and effective use of the prod.

Briefly, in carrying out the objects of this invention in one embodiment thereof, a self-contained electric stock prod is constructed of insulating materials and includes a handle housing an electric battery and a high voltage generator and a hollow shaft connected to the handle and having a bifurcated fitting at its opposite end which carries the spaced electrodes. The electrodes are spaced equally on opposite sides of the shaft, and the shaft may be adjusted to set the line of the tips at desired angles about the shaft with respect to the handle. The tips are exposed at the outer ends of two insulated fingers or extended projections and may be held along or close to an animal's body when the electric shock voltage is applied between the tips. Passages and chambers within the handles are provided to carry the high voltage leads and the control switch and are arranged to retain the conductors securely and to prevent shorting of the high voltage leads.

The prod of this invention may be used in the conventional manner with prodding or jabbing action; but in addition the new and different features of construction of the present prod adapt it for use in a new, different and advantageous manner. The operator is enabled to hold the prod against the side of an animal, ready for instant use, but without having to make a quick jab or thrust of the points thereby avoiding physical injury of the animal. Further, the prod head may be adjusted about its axis to any desired angle to meet the operator's individual requirements. The operator when positioned near the side of an animal is enabled to hold the prod with the shaft extending in the direction of movement of the animal and at an acute angle to the animal's side and may hold the head of the prod against the animal in readiness for use. By positioning the tips about the axis of the shaft so that, for the operator's position and manner of gripping the prod handle, both tips will engage the animal at the same time and the operator is assured that he can consistently apply the tips to the animal for effective engagement and shocking without having to make a direct jab of the tips against the animal. Thus the stock prod may be applied to the animal by a lateral swinging movement of the shaft toward the animal without the danger of a jabbing of the tips into the animal's body and possible injury to the animal. Should the animal then bolt forward the shaft affords such movement with minimum danger of the shaft's being rammed back toward the operator with possible injury to the operator or breaking of the shaft. These characteristics of the present stock prod are particularly useful for close quarter work such as at cattle chutes. Thus, even should the operator's view of the prod head be interrupted by a part of the chute or other structure, he can apply the head to the animal knowing from the position of the handle that the tips are in position for effective use. The configuration of the head provides a long insulated surface path between the conducting tips and greatly decreases the likelihood of leakage of high voltage current or arcing between the tips caused by the accretion of foreign matter on the head as experienced with the prior art structures.

The features of novelty which characterize this invention are set forth with particularity in the claims annexed to and forming a part of this specification. The invention itself, however, both as to its organization and its manner of operation, together with further objects and advantages thereof, will best be understood upon reference to the following description taken in connection with the accompanying drawings in which:

BRIEF DESCRIPTION OF THE DRAWINGS

FIG. 1 is a top view, partly broken away, of an electric stock prod embodying the invention;

FIG. 2 is an elevation view of the prod of FIG. 1;

FIG. 3 is an enlarged sectional view along the line 3—3 of FIG. 1;

DETAILED DESCRIPTION OF THE INVENTION

Figure 4:
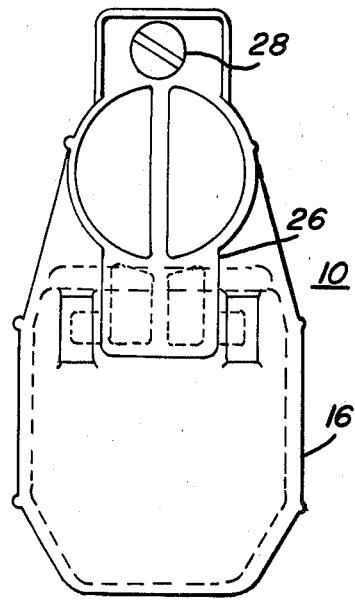
FIG. 4 is a rear elevation view of the prod.
Figure 5:
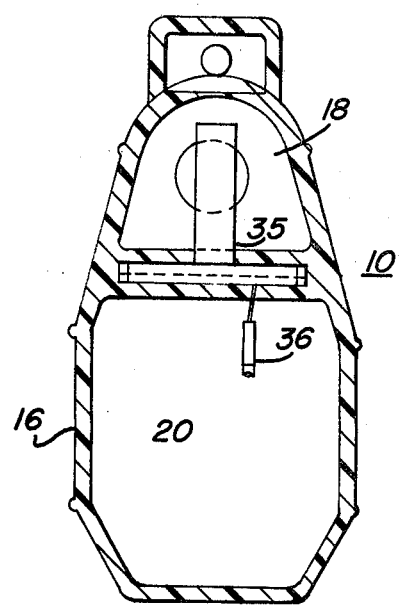
FIG. 5 is a sectional view along the line 5—5 of FIG. 3.
Figure 6:
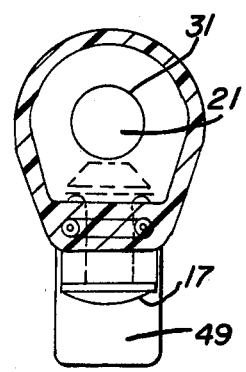
FIG. 6 is a sectional view along the line 6—6 of FIG. 3 with the switch contacts and battery omitted.

Referring now to the drawings, the stock prod illustrated in FIGS. 1 and 2 comprises a handle or body 10 having a front end carrying contacts adapted to engage in adjustable angular relation the contacts of a shaft 11 which is provided with a bifurcated fitting or head 12 at its outer end. The head 12 is fitted on the end of the shaft 11 and is secured thereto in fixed relationship. The head has two pointed conducting tips 13 to provide a substantially U-shaped head portion with said tips located one at the end of each branch or tine of the bifurcated fitting connected by a generally transverse, forward, outer portion 12' of the said head and is of a substantially relatively flat configuration. The U-shaped configuration of the head is completed by a generally transverse, forward, outer portion 12' of the head which connects the two branches thereof. The shaft is secured to the handle by a collet 14 threadedly engaging an externally threaded boss on the handle and which engages a sloping or split collar enlargement 15 which bears on the end portion of the shaft. The collet comprises a part of the assembly which affords angular adjustability of the shaft about its axis to position the tips 13 at the desired angular position with respect to the handle. The handle 10 is formed with an enlarged portion 16 which extends downwardly along about the rear one-third of the handle. The features of the head, including its having a width substantially greater than its thickness, together with the angle adjusting feature make it easy to use the prod without jabbing the animal with the points or tips. The greater width of the head as compared with its thickness enables the operator to know both by sight and by feeling the position of the pair of conducting tips.

The terms "relatively flat" and "generally flat" as used herein, have reference to head structures such as illustrated in the drawings and also include variations and alterations from "mathematically pure flatness"; i.e., these terms include structures having sufficient flatness to accomplish the objects of the invention.

During use the stock prod is gripped by the handle, the index finger being held near a push button 17 which when pressed actuates a generator within the enlarged portion 16 and applies a high voltage difference between the terminals which voltage is thus impressed across a portion of an animal's skin which is between and contacted by the tips 13.

Figure 7:
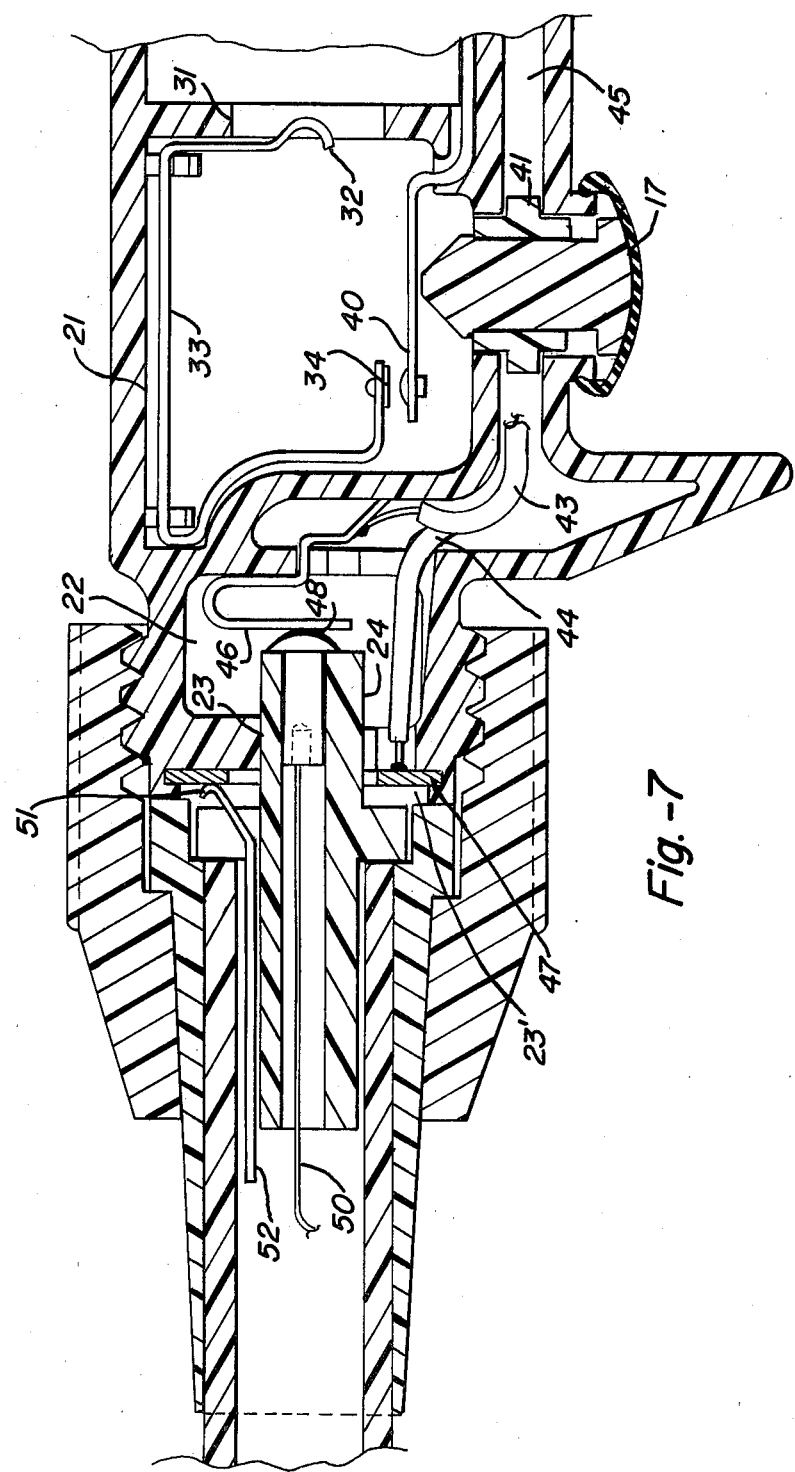
FIG. 7 is an enlarged view of the forward portion of the prod as shown in FIG. 3.

The details of construction of the handle 10 are shown in FIGS. 3 and 7. The handle is molded in two halves which are cemented or welded together to provide the enclosed structure. The section line 3—3 of FIG. 1 indicates the plane of the opposite faces of the two halves of the molded body. The cross-hatching of the section indicates that the plane of the cut is just under the surface of the molded half and serves to identify more clearly the separate parts of the handle.

Referring now to FIG. 3 the handle 10 is formed to provide an elongated battery chamber 18, a generator chamber 20 and a switch chamber 21. A fourth chamber, indicated at 22, is provided at the front end of the handle and has an opening 23 for receiving a reduced end portion 24 of the shaft 11. A plurality of dry cell batteries 25 are arranged in series within the chamber 18; a closure 26 pivotally mounted on a shaft 27 is secured in its closed position by a machine screw 28.

The batteries 25 are positioned with their positive center poles facing to the left, the pole of the left hand battery being indicated at 30. The pole 30 extends into an opening 31 between the chambers 18 and 21 and engages a spring contact 32 which provides a conducting path through a lead 33 to a fixed contact 34. The bottom of the case of the right hand battery 25 engages a spring contact 35 which on closing of the closure 26 is pressed to the left and acts to urge the batteries to the left and is connected to an input lead 36 of the high voltage generator indicated at 37. The other input lead 38 of the generator is connected to a conducting spring arm 40 positioned to engage the contact 34 when the push button 17 is pressed upwardly. The push button is slidably mounted in an insulating collar 41 and is provided with a flexible sealing collar 42.

The generator 37 is the solid state circuit type and is potted in a suitable potting compound and completely fills the chamber 20 in which it is sealed. The generator has high voltage output leads 43 and 44 which pass from the chamber 20 through a passage 45 to a spring contact 46 located in the chamber 22 and a ring contact 47 mounted on the outer end wall of the chamber 22, respectively. The contact 46 is engaged by a center contact 48 on the shaft extension 24 which is connected to one of the tips 13 by a lead 50; the ring contact 47 is slidably engaged by a spring contact 51 on the shaft end fitting and is thereby connected to the other tip 13 through an insulated lead 52. The leads 43, 44, 50 and 52 are insulated sufficiently to prevent shorting of the high voltage within the handle and shaft. A downward double walled extension 49 of the walls of the handle 10 provides a guard for the button 17 to prevent accidental charging of the prod generator and also provides a reference or location point for the user's finger.

The arrangement of the spring contact 46 and the ring contact 47 which is forwardly and radially spaced therefrom allows the shaft to be rotated when the collet 14 is loosened, so that the shaft may be placed with the tips 13 extending in any angular position line about the shaft axis. When the shaft is in its desired position the collet is tightened to hold or lock the shaft and handle assembly securely together. The fit of the extension 24 within the opening 23 is close and minimizes the possibility of electrical discharge or arcing across between the bare contacts in the chamber 22 and the contact 51 engaging the ring 47 in the annular chamber 23'.

During the operation of the stock prod, when the button 17 is pressed the switch 40 is closed and the generator 37 is energized and impresses a high voltage across the tips 13. When the tips touch an animal's skin the electric voltage applied is sufficient to produce the desired shock effect. The prod may be used repeatedly and the proper positioning of the angle of the tips 13 about the axis of the shaft and with respect to the handle 10 facilitates the application of the prod to one animal after another using the same hand position of the operator, and makes it easy to select a position of the head of the prod such that it may be held in substantially flat face engagement with the animal with minimum likelihood that the tips will jab the animal. Furthermore, the construction of the head of the prod is such that it is easily kept clean and free from mud, dung, or other debris which might short-circuit the terminals or decrease the intensity of the discharge.

Figure 8:
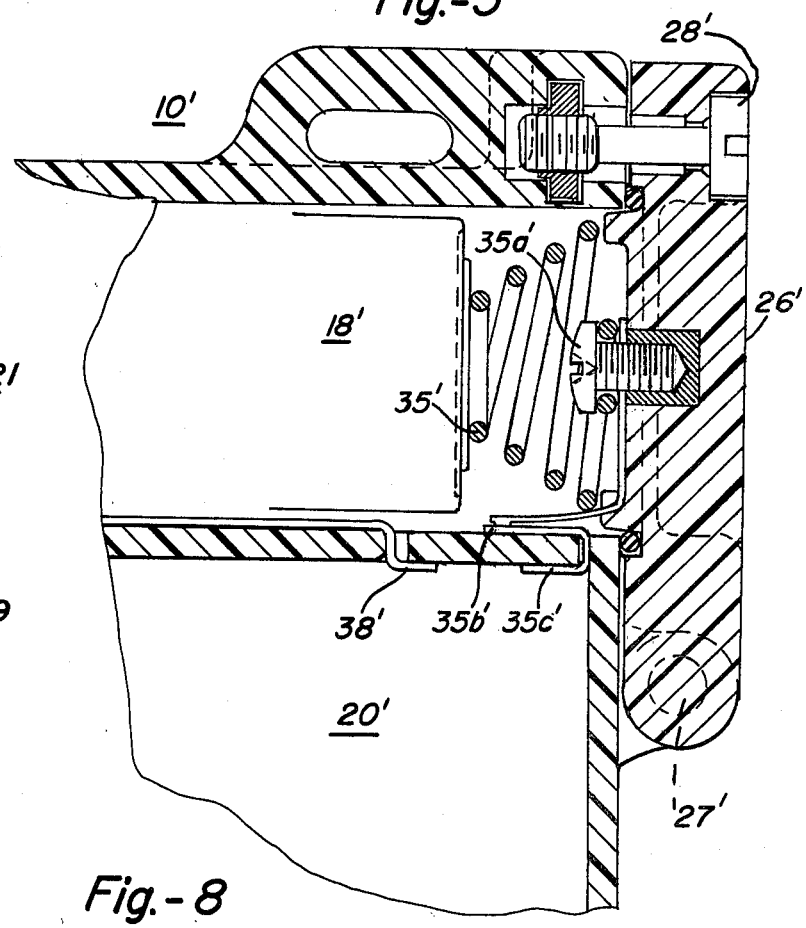
FIG. 8 is an enlarged view showing a modified arrangement of the upper rear portion of the prod as shown in FIG. 3.

FIG. 8 illustrates a modified arrangement of the battery retainer and base contact arrangement, wherein the same parts have been designated by the same numerals as used in FIG. 3 each with a prime. In this arrangement a tapered coil spring 35' provides contact with the base of the battery 18' and has its other end secured to a threaded post 35a' which, in turn, is connected to a flat spring contact member 35b' which, in the closed position of the closure 26', contacts a fixed strip 35c' which enters the compartment 20' for engagement with the lead 36 shown in FIG. 3. When the closure 26' is opened the spring 35' moves away from the base of the battery and the spring member 35b' moves away from the strip 35c' so that both contacts are broken and the closure may be moved out of the path of the batteries during loading and unloading.

Figure 9:
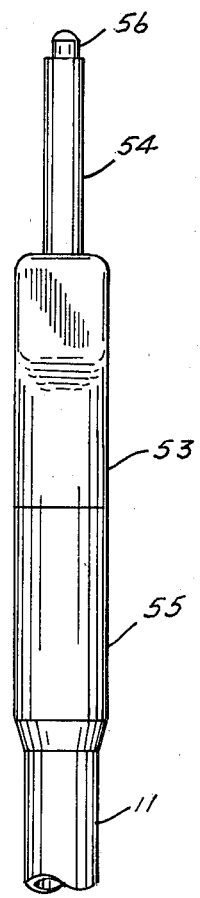
FIGS. 9, 10, and 11 are, respectively, side, face and end views of a modified form of the head of the prod.
Figure 10:
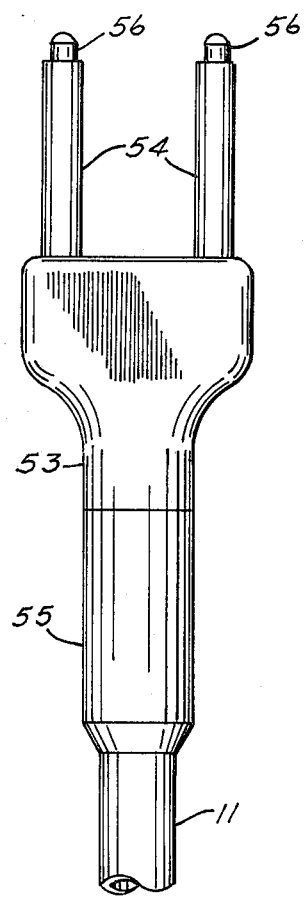
Figure 11:
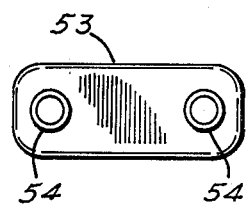

FIGS. 9, 10 and 11 illustrate a head comprising a relatively flat body portion 53 having a pair of insulating fingers 54 projecting therefrom and an attaching sleeve 55. The fingers 54 comprise cylindrical plastic members and surround electrical conductors terminating in tips 56. The body 53 and the fingers 54 are of preferably smooth plastic material. The conducting tips are spaced a distance sufficient to afford easy cleaning of the space between the fingers and the fingers are of a length within a range of the order of their spacing to about two times their spacing, and provide an elongated leakage path between the conducting terminals or tips. As stated before the flat configuration of the head facilitates its being placed against the animal's skin without jabbing the animal with the contact tips, and the adjustment of the shaft about its axis allows the operator to place the head in the best position with respect to the handle for his use in repeated operations from the same position. Thus, as pointed out above, the need for jabbing of the animal is reduced and breakage of the shaft, and possible injury to the operator is thereby effectively reduced.

Figure 12:
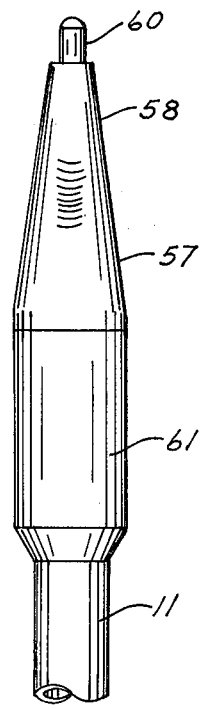
FIGS. 12, 13 and 14 are, respectively, side face and end views of a further modified form of the head of the prod.
Figure 13:
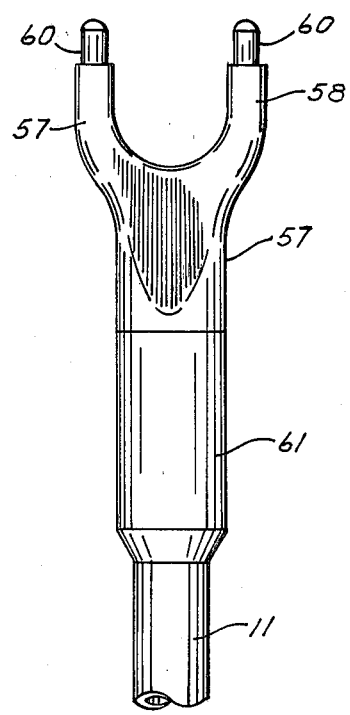
Figure 14:
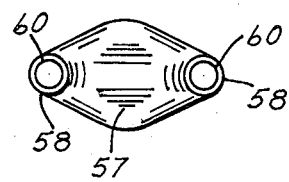

FIGS. 12, 13 and 14 illustrate a further modification of the head which is somewhat similar to that of FIGS. 1 and 2. Here the head comprises a relatively flat body 57 terminating in fingers 58 which are of a length about equal to the spacing between the fingers. The configuration of the finger portion of the head is arcuate between the fingers and forms a semi-circle. The fingers terminate at electric conducting tips 60. The body is secured on the shaft 11 by an attaching sleeve 61.

All three illustrated embodiments of the head or fitting which carries the spaced electric contacts which are of substantially U-shaped configuration, preferably with a width substantially greater than its thickness and have the same advantage of relative flatness and ease of applying the electric tips to an animal's skin without digging or jabbing with the tips. Furthermore, the insulated fingers or projections are arranged so that they may lie close to or in contact with the animal's skin and hold the conducting tips in their spaced relationship during the delivery of the electric charge. Furthermore, all of the heads are constructed of smooth insulating material such as a suitable synthetic plastic and are easily cleaned and tend less to accumulate mud, dung or the like which might impair the effectiveness of the prod. This configuration and arrangement of the shaft and head of the prod and the insulating projections or fingers provides for ease in maintaining the full effectiveness of the prod while making possible the minimizing of physical damage to an animal which can result from direct jabbing action of the electrical tips.

In all three embodiments of the tip fitting or head construction, it has been found to be desirable to provide a space between the contact tips which is within a range of about five-eighths inch to two inches, a spacing of about one and one-half inches having been found very effective for general application.

While the invention has been described in connection with the details of one embodiment various other embodiments will occur to those skilled in the art. Therefore, it is not desired that the invention be limited to the details illustrated and it is intended, by the appended claims to cover all embodiments which fall within the spirit and scope of the invention.

We claim:

1. A head for an electric animal prod or the like comprising a body of insulating material having a width substantially greater than its thickness and having a shaft attaching means at its rear end adapted to receive a shaft extending rearwardly thereof, a pair of spaced electric contact tips secured to and projecting forwardly from the front end of said body, the front end of said body having a configuration between said tips providing a long insulated path between said tips having a length substantially greater than the spacing between said tips, said body being adapted to be placed laterally against an animal with said tips in position for simultaneous electrical contact with the animal.

2. A head for an electric animal prod or the like as set forth in claim 1 including a shaft secured at its front end in said attaching means, a handle of insulating material having a high voltage generator therein, means detachably securing the rear end of said shaft to said handle and having electrical conductors in said handle and in said shaft for connecting the output of said generator to said tips, and means adapted to lock said shaft to said handle in selected positions about its axis whereby the angular position of said body with respect to said handle is adapted to be adjusted.

3. A head for an electric animal prod or the like as set forth in claim 1 or claim 2 wherein said body is formed to provide fingers projecting forwardly therefrom and said tips are located at the far ends of said fingers.

4. An end fitting for an electric animal prod or the like having a forward end and a rearward end and a shaft attaching means positioned at its rearward end and adapted to receive a shaft extending rearwardly thereof, and including a head having at least a portion having a substantially U-shaped configuration and comprising a body of insulating material having a width substantially greater than its thickness, and having a pair of spaced fingers of insulating material projecting from the forward end of said body and constituting the sides of the U, and bare electric contact tips at the outer ends of said fingers for applying an electric shock to an animal, said fingers, when the wide side of the head is held against an animal, being adapted to afford the simultaneous application of said tips to an animal's skin, the insulating material of the fingers providing, with the insulating material of the body, a long insulated surface path between said tips.

5. An end fitting as set forth in claim 4 wherein said fingers lie in substantially the same plane.

6. An end fitting as set forth in claim 5 wherein said fingers are substantially parallel to one another.

7. An end fitting as set forth in claim 4 wherein said body is generally flat and said fingers lie in the general plane of the body.

8. An end fitting as set forth in claim 7 wherein the length of said fingers is within a range of from about the spacing between said terminals to about two times said spacing.

9. An end fitting as set forth in claim 4 wherein said body and said fingers have smooth surfaces for facilitating the cleaning thereof and for minimizing the clinging of foreign matter thereto.

10. An electric stock prod or the like comprising an insulating handle and a shaft of insulating material extending therefrom and having a near end and a remote end, and a shock applying fitting affixed to said remote end of said shaft, a high voltage generator mounted within said handle and having a pair of high voltage output conductors and a switch on said handle for controlling said generator, said shock applying fitting comprising a head of insulating material having a substantially U-shaped portion and including a relatively flat body having a thickness of the order of that of said shaft and a width substantially greater than its thickness, and a pair of spaced parallel fingers of insulating material extending therefrom in general alignment therewith and constituting the sides of the said U-shaped portion of said head, said fingers having exposed electric contact terminals at their tips, the insulating material of each of said fingers extending from the respective one of said tips to said body, and separate first and second conducting means for respectively connecting each of said contact terminals to a respective one of said high voltage output conductors, whereby a side of the head is adapted to be positioned against the body of an animal and held in substantial facial engagement therewith and the contact terminals are adapted to be pressed into engagement with the body of the animal while the head remains with its flat side against the body of the animal for applying the electric shock.

11. An electric stock prod or the like as set forth in claim 10 wherein the space between said terminals is of the order of from five-eighths inch to two inches.

12. An electric stock prod or the like as set forth in claim 10 wherein said shaft is mounted on said handle for rotation about its axis, and means for locking said shaft in selected positions about its axis whereby said shock applying fitting may be locked with said relatively flat body in selected angular positions about the axis of said handle.

13. An electric stock prod or the like as set forth in claim 12 including means for maintaining said tips and said output conductors in conducting relationship regardless of the position of said shaft about its axis.

14. An electric stock prod or the like as set forth in claim 12 wherein the length of said fingers is within a range of from about the spacing between said terminals to about two times said spacing.

15. An electric stock prod or the like as set forth in claim 12 wherein said locking means comprises an externally threaded boss on said handle and means including a collet threadedly engaging said boss for urging said shaft toward said boss and for clamping respective ones of said contact elements in engagement.

16. A combined shaft and head for electric animal prods and the like, said head being mounted at one end of said shaft, and at least a portion thereof remote from said shaft having a substantially U-shaped configuration, said head comprising a body of insulating material having a width substantially greater than its thickness and having opposite relatively flat faces and a pair of spaced fingers of insulating material extending therefrom in general alignment with said shaft and with the plane of the said body and constituting the sides of the U of the U-shaped configuration, exposed electrical contacting terminals at the tips of said fingers for engaging the body of an animal, the configuration of said head adapting it to be applied with said shaft and extending laterally from the axis of the shaft against the body of an animal substantially in facial engagement with the said body of the said animal and with both of said exposed terminals close to, or touching, the said animal body, with the insulating material of the said fingers extending from the said tips thereof to the insulating material of said head body, the length of said fingers being at least of the order of the width of the space therebetween and providing a long insulated path over the surfaces of said fingers and said body between said terminals.

17. A combined shaft and head for electric animal prods and the like as set forth in claim 16 wherein said body and said fingers have smooth surfaces for facilitating the cleaning thereof and for minimizing the clinging of foreign matter to said head.

18. A combined shaft and head for electrical animal prods and the like as set forth in claim 16 wherein the length of said fingers is within a range of from about the spacing between said terminals to about two times said spacing.

19. A combined shaft and head for electric animal prods and the like as set forth in claim 16 wherein the space between said tips is of the order of from five-eighths inch to two inches.

20. An electric stock prod or the like comprising an insulating handle and a shaft of insulating material extending therefrom and having a near end and a remote end,
 and a shock applying fitting affixed to said remote end of said shaft,
 a high voltage generator mounted within said handle and having a pair of high voltage output conductors and a switch on said handle for controlling said generator,
 said shock applying fitting comprising a head of insulating material having a substantially U-shaped portion and including a relatively flat body having a thickness of the order of that of said shaft and a width substantially greater than its thickness, and a pair of spaced parallel fingers of insulating material extending therefrom in general alignment therewith and constituting the sides of the said U-shaped portion of said head,
 said fingers having exposed electric contact terminals at their tips, the insulating material of each of said fingers extending from the respective one of said tips to said body,
 separate first and second conducting means for respectively connecting each of said contact terminals to a respective one of said high voltage output conductors,
 whereby a side of the head is adapted to be positioned against the body of an animal and held in substantial facial engagement therewith and the contact terminals are adapted to be pressed into engagement with the body of the animal while the head remains with its flat side against the body of the animal for applying the electric shock,
 including means for detachably securing said shaft to said handle, said detachable securing means including a connecting fitting of electric insulating material secured to the rear end of said shaft and having a central portion of reduced cross section extending axially rearwardly beyond said shaft, wherein said conducting means includes two electric leads extending through said shaft and each being connected to a respective one of said contact terminals, and wherein each of said first and second conducting means includes a pair of separable contact elements for connecting a respective one of said electric leads to a respective one of said high voltage conductors, each of said pairs including one of said elements at the end of one of said leads and another of said elements at the end of one of said high voltage conductors, one of said electric leads extending through the center of said fitting and a first of said lead contact elements being secured to the end of said portion and being connected to said one lead, the other of said electric leads being connected to a second of said lead contact elements, said second contact element being mounted on said fitting and spaced axially forwardly and radially from said first contact element, said detachable securing means including means providing separate insulated compartments for said contact elements on said output leads for effectively insulating the engaged pairs of contacts from one another.

21. An electric stock prod or the like as set forth in claim 20 wherein said means providing separate compartments includes a hollow boss at the end of said handle adjacent said shaft and having an end wall with an opening therein of a configuration conforming closely to the cross section of said extended portion of said connecting fitting and constituting a wall separating said compartments.

22. An electric stock prod or the like as set forth in claim 20 or in claim 21 wherein said shaft is mounted on said handle for rotation about its axis, and means for locking said shaft in selected positions about its axis whereby said shock applying fitting may be locked with said relatively flat body in selected angular positions about said axis with respect to said handle.

23. An electric stock prod or the like as set forth in claim 20 or in claim 21 including means for maintaining said tips and said output conductors in conducting relationship regardless of the position of said handle about the axis of said shaft.

* * * * *

REEXAMINATION CERTIFICATE (1036th)
United States Patent [19]
Andrews et al.

[11] B1 4,394,956
[45] Certificate Issued Apr. 18, 1989

[54] ELECTRIC STOCK PROD

[75] Inventors: James S. Andrews, Westminster; Leonard L. Hierath, Denver, both of Colo.

[73] Assignee: The Magrath Company, McCook, Nebr.

Reexamination Request:
No. 90/001,470, Mar. 14, 1988

Reexamination Certificate for:
Patent No.: 4,394,956
Issued: Jul. 26, 1983
Appl. No.: 62,450
Filed: Jul. 30, 1979

Related U.S. Application Data

[63] Continuation of Ser. No. 754,341, Dec. 27, 1976, abandoned.

[51] Int. Cl.$^4$ ............... B68B 11/00; F41B 15/04
[52] U.S. Cl. ................... 231/7; 273/84 ES; 362/197; 362/202; 362/203; 362/204; 362/205; 362/206; 362/207
[58] Field of Search ............... 231/7; 273/84 ES

[56] References Cited

U.S. PATENT DOCUMENTS

| | | | |
|---|---|---|---|
| 427,549 | 5/1890 | Burton | 231/7 |
| 1,210,112 | 12/1916 | Smith | 231/7 |
| 2,253,315 | 8/1941 | Andorus | 231/7 |
| 2,304,065 | 12/1942 | Wright | 231/7 |
| 2,733,003 | 1/1956 | Abildgaard et al. | 231/7 |
| 2,981,465 | 7/1960 | Bartel | 231/2 |

FOREIGN PATENT DOCUMENTS

| | | | |
|---|---|---|---|
| 94184 | 8/1975 | Japan | |
| 1448644 | 9/1976 | United Kingdom | 231/7 |

Primary Examiner—Paul J. Hirsch

[57] ABSTRACT

A stock or cattle prod for applying an electric shock to stock to induce them to move when loading them for transportation or through a cattle chute or the like comprises a handle having a high voltage generator and a battery therein. A head, which is angularly rotatable relative to the handle structure, is provided, this head having electrical contact means adapted to electrically, conductively contact said handle in any selectable angular position therebetween the head being adapted to extend forward from said handle and comprising a shaft carrying the contact means and, forward from this shaft terminating in a pair of spaced conducting tips or electrodes. The handle is constructed to insulate and protect the high voltage conductors and to provide a convenient switch for energizing the tips. The handle and shaft are constructed to afford rotation of the tips to any desired angle with respect to the operator's hand, both the handle and head being provided with external electrical insulation means effective to protect the operator from the electrical shock voltage, insulation while maintaining the electrical connections to the tips. The head on which the tips are mounted is relatively flat and is adapted to be held in face engagement with an animal's body, this facilitating the effective handling of the prod during use.

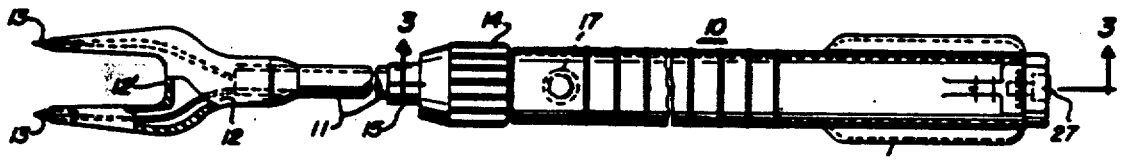

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1 lines 12 to 24:
Reference is made herewith to Design Pat. No. 244,626, having as inventor one of the inventors of this application and being assigned to the assignee hereof, said Design Patent being directed solely to two preferred ornamental designs of the external surfaces of the head structure described, illustrated and claimed herein, said Design Pat. No. 244,626 having matured from Design Application Ser. No. 692,567, filed June 3, 1976, and having issued on June 7, 1977, so that it was copending with the parent applications Ser. No. 727,021, filed Sept. 27, 1976 now abandoned, and Continuation-In-Part thereof Ser. No. 754,341, filed Dec. 27, [1966] *1976* now abandoned.

AS A RESULT OF REEXAMINATION, IT HAS BEEN DETERMINED THAT:

The patentability of claims 10–15 and 20–23 is confirmed.

Claims 1, 4 and 16 are determined to be patentable as amended.

Claims 2, 3, 5–9 and 17–19, dependent on an amended claim, are determined to be patentable.

New claims 24–28 are added and determined to be patentable.

1. A head for an electric animal prod or the like comprising a body of insulating material having a width substantially greater than its thickness and having a shaft attaching means at its rear end adapted to receive a shaft extending rearwardly thereof, *in fixed relationship thereto, said attaching means holding said head and shaft substantially rigid with respect to one another,* a pair of spaced electric contact tips secured to and projecting forwardly from the front end of said body, the front end of said body having a configuration between said tips providing a long insulated path between said tips having a length substantially greater than the spacing between said tips, said body being adapted to be placed laterally against an animal *in substantial facial engagement,* with said tips in position for simultaneous electrical contact with the animal.

4. An end fitting for an electric animal prod or the like having a forward end and a rearward end and a shaft attaching means positioned at its rearward end and adapted to receive a shaft extending rearwardly thereof, *and secured thereto in fixed relationship* and including a head having at least a portion having a substantially U-shaped configuration and comprising a body of insulating material having a width substantially greater than its thickness, and having a pair of spaced fingers of insulating material projecting from the forward end of said body and constituting the sides of the U, *said attaching means holding said head and shaft substantially rigid with respect to one another*
   and bare electric contact *and prodding* tips at the outer ends of said fingers for applying an electric shock to an animal,
   said fingers, when the wide side of the head is held against an animal, *in substantial facial engagement* being adapted to afford the simultaneous application of said tips to an animals's skin, the insulating material of the fingers providing, with the insulating material of the body, a long insulated surface path between said tips.

16. A combined shaft and head for electric animal prods and the like, said head being mounted *in fixed relationship* at one end of said shaft, *attaching means holding said head and shaft substantially rigid with respect to one another* and at least a portion thereof remote from said shaft having a substantially U-shaped configuration, said head comprising a body of insulating material having a width substantially greater than its thickness and having opposite relatively flat faces and a pair of spaced fingers of insulating material extending therefrom in general alignment with said shaft and with the plane of the said body and constituting the sides of the U of the U-shaped configuration,
   exposed electrical contacting, *and prodding* terminals at the tips of said fingers for engaging the body of an animal,
   said fingers for engaging the body of an animal, the configuration of said head adapted it to be applied with said shaft and extending laterally from the axis of the shaft against the body of an animal substantially in facial engagement with the said body of the said animal and with both of said exposed terminals close to, or touching, the said animal body,
   with the insulating material of the said fingers extending from the said tips thereof to the insulating material of said head body,
   the length of said fingers being at least of the order of the width of the space therebetween and providing a long insulated path over the surfaces of said fingers and said body between said terminals.

*24. The invention set forth in claim 1 wherein said configuration of said front end of said body is of decreased cross-section forwardly of said body.*

*25. The invention set forth in claim 4 wherein said fingers are of decreased cross-section from the forward end of said body to said tips.*

*26. The invention set forth in claim 10 wherein said fingers are of decreased cross-section between said body and said contact terminals.*

*27. The invention set forth in claim 26 wherein said fingers are of tapered configuration from said body toward said terminals.*

*28. The invention set forth in claim 16 wherein said fingers are of decreasing cross-section between said head body and said tips.*

* * * * *